United States Patent
Zhang et al.

(10) Patent No.: US 10,007,451 B2
(45) Date of Patent: Jun. 26, 2018

(54) SCALABLE SPOR ALGORITHM FOR FLASH MEMORIES

(71) Applicant: SK hynix Inc., San Jose, CA (US)

(72) Inventors: Fan Zhang, Fremont, CA (US); Tan Liu, Pewaukee, WI (US); Constantino Rosario, San Jose, CA (US)

(73) Assignee: SK Hynix Inc., Gyeonggi-do (KR)

( * ) Notice: Subject to any disclaimer, the term of this patent is extended or adjusted under 35 U.S.C. 154(b) by 99 days.

(21) Appl. No.: 15/076,350

(22) Filed: Mar. 21, 2016

(65) Prior Publication Data

US 2016/0274808 A1 Sep. 22, 2016

Related U.S. Application Data

(63) Continuation of application No. 62/135,948, filed on Mar. 20, 2015.

(51) Int. Cl.
*G06F 3/06* (2006.01)

(52) U.S. Cl.
CPC ............ *G06F 3/0619* (2013.01); *G06F 3/064* (2013.01); *G06F 3/0616* (2013.01); *G06F 3/0679* (2013.01); *G06F 3/0688* (2013.01)

(58) Field of Classification Search
CPC ...... G06F 3/0619; G06F 3/0679; G06F 3/064; G06F 2212/7201; G06F 11/1441; G06F 12/0246; G06F 3/0656; G06F 11/1446; G06F 3/0688; G06F 11/1451; G06F 11/1469; G06F 3/0616

See application file for complete search history.

(56) References Cited

U.S. PATENT DOCUMENTS

| 2013/0145085 A1* | 6/2013 | Yu ....................... G06F 12/0246 711/103 |
| 2015/0186224 A1* | 7/2015 | Lin ..................... G06F 11/1469 714/6.12 |

FOREIGN PATENT DOCUMENTS

| KR | 1020110098518 | 9/2011 |
| KR | 1020150085036 | 7/2015 |

* cited by examiner

*Primary Examiner* — Zhuo Li
(74) *Attorney, Agent, or Firm* — IP & T Group LLP (57) ABSTRACT

Methods of sudden power off recovery may include reading dirty-block meta-pages from memory blocks on a dirty block list, recording mapping in formation in open-block meta-pages, serving host commands by looking up logical block addresses (LBAs) in the dirty-block meta-pages and the open-block meta-pages and when an LBA is not found in the dirty-block meta-pages and the open-block meta-pages, reading new mapping information from a dirty table and saving the new mapping information in host-write meta-pages.

13 Claims, 7 Drawing Sheets

SCALABLE SPOR ALGORITHM FOR FLASH MEMORIES

CROSS-REFERENCE TO RELATED APPLICATIONS

This application claims the benefit of U.S. Provisional Application No. 62/135,948 filed Mar. 20, 2015, the entire contents of which are incorporated herein by reference.

BACKGROUND

1. Field

Exemplary embodiments of the present disclosure relate to a memory controller and an operating method thereof.

2. Description of the Related Art

Semiconductor memory devices are generally classified into volatile memory devices such as a dynamic random access memory (DRAM) and a static RAM (SRAM), and nonvolatile memory devices, such as a read only memory (ROM), a mask ROM (MROM), a programmable ROM (PROM), an erasable PROM (EPROM), an electrically EPROM (EEPROM), a ferromagnetic RAM (FRAM), a phase change RAM (PRAM), a magnetoresistive RAM (MRAM), a resistive RAM (RRAM) and a flash memory.

Volatile memory devices lose their stored data when their power supply is interrupted, whereas nonvolatile memory devices retain their data even without a constant source of power. Flash memory devices are widely used as a storage medium in computer systems because of their high program speed, low power consumption and large data storage capacity.

As capacities increase and size decreases, durability and reliability of flash memories are of concern. There exists a need for improved systems that increase the durability and reliability of flash memories.

SUMMARY

Aspects of the invention include methods of sudden power off recovery. The methods may include reading dirty-block meta-pages from memory blocks on a dirty block list, recording mapping information in open-block meta-pages, serving host commands by looking up logical block addresses (LBAs) in the dirty-block meta-pages and the open-block meta-pages, and when an LBA is not found in the dirty-block meta-pages and the open-block meta-pages, reading new mapping information from a dirty table and saving the new mapping information in host-write meta-pages.

Further aspects of the invention include systems for sudden power off recovery. The systems may include a dynamic random access memory (DRAM) including a flash transition layer (FTL) table, a memory storage suitable for storing dirty-block meta-pages, open-block meta-pages, and host-write meta-pages, and a controller suitable for, reading the dirty-block meta-pages from memory blocks on a dirty block list, recording mapping information in the open-block meta-pages, serving host commands by looking up logical block addresses (LBAs) in the dirty-block meta-pages and the open-block meta-pages, and when an LBA is not found in the dirty-block meta-pages and the open-block meta-pages, reading new mapping information from the FTL table and saving the new napping information in the host-write meta-pages.

Further aspects of the invention include memory devices. The memory devices may include a controller configured to read dirty-block meta-pages from memory blocks on a dirty block list, record mapping information in open-block meta-pages, serve host commands by looking up logical block addresses (LBAs) in the dirty-block meta-pages and the open-block meta-pages, and when an LBA is not found in the dirty-block meta-pages and the open-block meta-pages, read new mapping information from a dirty table and save the new mapping information in host-write meta-pages.

DETAILED DESCRIPTION

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The invention can be implemented in num rots ways, including as a process; an apparatus; a system; a composition of matter; a computer program product embodied on a computer readable storage medium and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily suitable for performing the task at a given time or a specific component that is manufactured to perform the task. As used herein, the term 'processor' refers to one or more devices, circuits, and/or processing cores suitable for processing data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
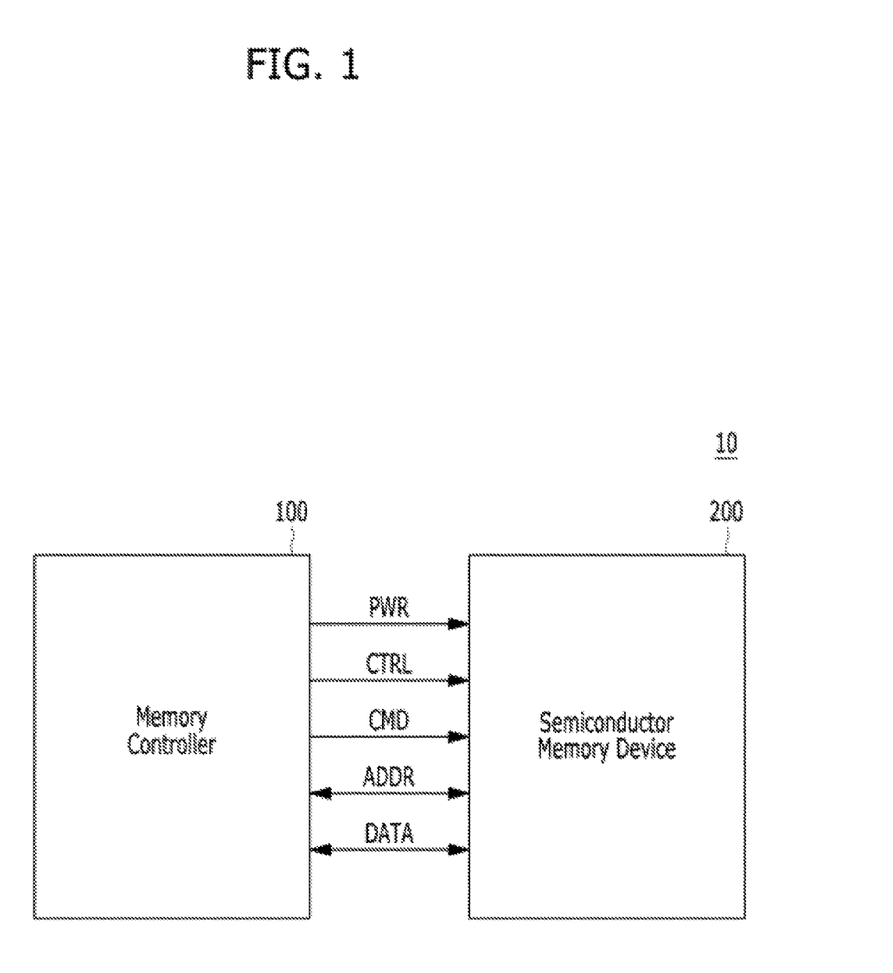
FIG. 1 is a block diagram schematically illustrating a memory system in accordance with an embodiment of the present invention.

FIG. 1 is a block diagram schematically illustrating a memory system 10 in accordance with an embodiment of the present invention.

Referring FIG. 1, the memory system 10 may include a memory controller 100 and a semiconductor memory device 200.

The memory controller 100 may control overall operations of the semiconductor memory device 200.

The semiconductor memory device 200 may perform one or more erase, program, and read operations under the control of the memory controller 100. The semiconductor memory device 200 may receive a command CMD, an address ADDR and data DATA through input/output lines. The semiconductor memory device 200 may receive power PWR through a power line and a control signal CTRL through a control line. The control signal may include a command latch enable (CLE) signal, an address latch enable (ALE) signal, a chip enable (CE) signal, a write enable (WE) signal, a read enable (RE) signal, and so on.

The memory controller 100 and the semiconductor memory device 200 may be integrated in a single semiconductor device. For example, the memory controller 100 and the semiconductor memory device 200 may be integrated in a single semiconductor device such as a solid state drive (SSD). The solid state drive may include a storage device for storing data therein. When the semiconductor memory system 10 is used in an SSD, operation speed of a host (not shown) coupled to the memory system 10 may remarkably improve.

The memory controller 100 and the semiconductor memory device 200 may be integrated in a single semiconductor device such as a memory card. For example, the memory controller 100 and the semiconductor memory device 200 may be integrated in a single semiconductor device to configure a memory card such as a PC card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC), and a universal flash storage (UFS).

For another example the memory system 10 may be provided as one of various elements including an electronic device such as computer, an ultra-mobile PC (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, one of electronic devices of a home network, one of electronic devices of a computer network, one of electronic devices of a telematics network, a radio-frequency identification (RFID) device, or elements devices of a computing system.

Figure 2:
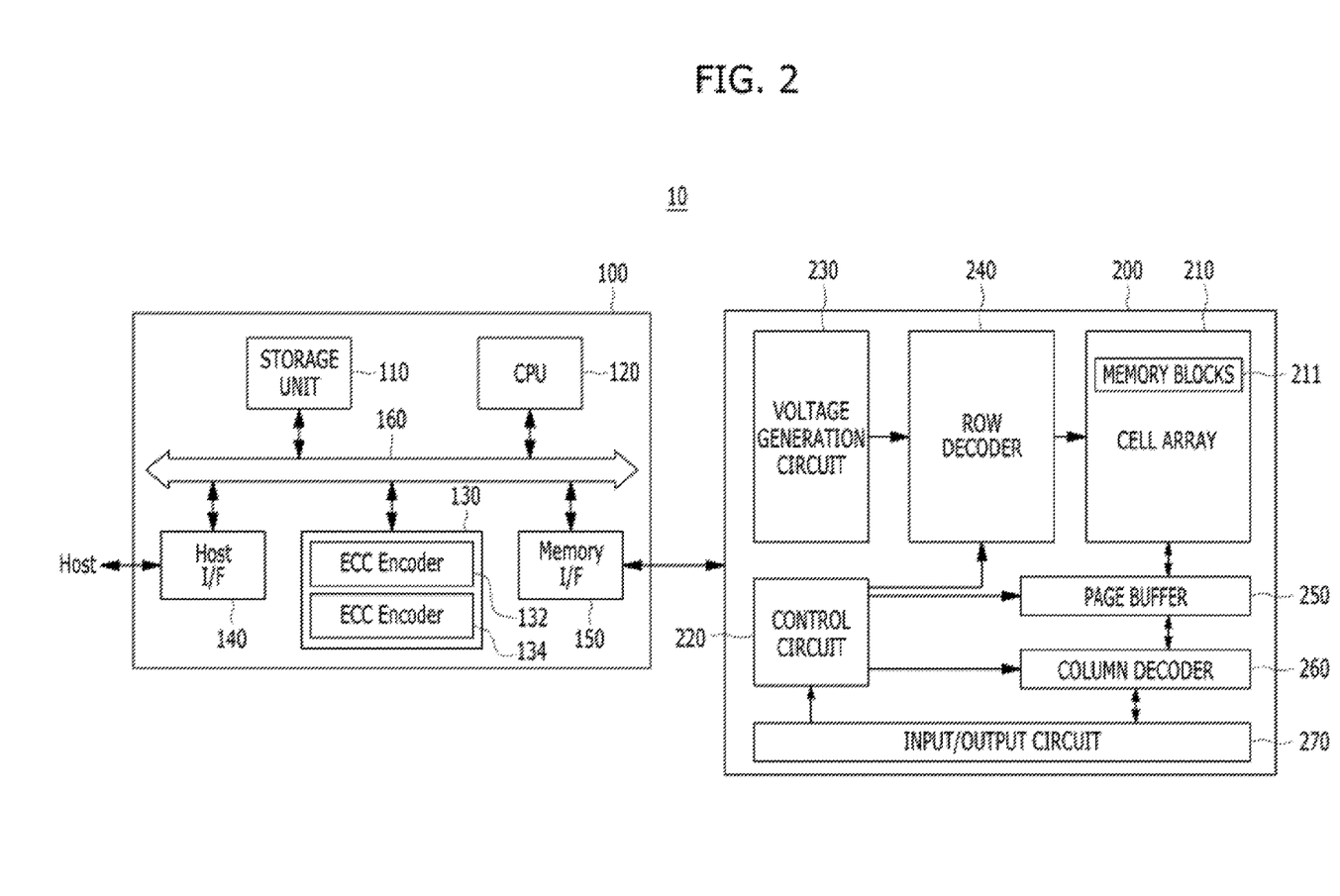
FIG. 2 is a block diagram illustrating a memory system in accordance with an embodiment of the present invention.

FIG. 2 is a detailed block diagram illustrating a memory system in accordance with an embodiment of the present invention. For example, the memory system of FIG. 2 may be the memory system 10 shown in FIG. 1.

Referring to FIG. 2, the memory system 10 may include a memory controller 100 and a semiconductor memory device 200. The memory system 10 may operate in response to a request from a host device, and in particular, store data to be accessed by the host device.

The host device may be implemented with any one of various kinds of electronic devices. In some embodiments, the host device may include an electronic device such as e a desktop computer, a workstation, a three-dimensional (3D) television a smart television, a digital audio recorder, a digital audio player, a digital picture recorder, a digital picture player, a digital video recorder and a digital video player. In some embodiments, the host device may include a portable electronic device such as a mobile phone, a smart phone an e-book, an MP3 player, a portable multimedia player (PMP), and a portable game player.

The memory device 200 may store data to be accessed by the host device.

The memory device 200 may be implemented with a volatile memory device such as a dynamic random access memory (DRAM) and a static random access memory (SRAM) or a non-volatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM) and a resistive RAM (RRAM).

The controller 100 may control storage of data in the memory device 200. For example, the controller 100 may control the memory device 200 in response to a request from the host device. The controller 100 may provide the data read from the memory device 200, to the host device, and store the data provided from the host device into the memory device 200.

The controller 100 may include a storage unit 110, a central processing unit (CPU) 120, the error correction code (ECC) unit 130, a host interface 140 and a memory interface 150, which are coupled through a bus 160.

The storage unit 110 may serve as a working memory of the memory system 10 and the controller 100, and store data for driving the memory system 10 and the controller 100. When the controller 100 controls operations of the memory device 200, the storage unit 110 may store data used by the controller 100 and the memory device 200 for such operations as read, write, program and erase operations.

The storage unit 110 may be implemented with a volatile memory. The storage unit 110 may be implemented with a static random access memory (SRAM) or a dynamic random access memory (DRAM). As described above, the storage unit 110 may store data used by the host device in the memory device 200 for the read and write operations. To store the data, the storage unit 110 may include a program memory, a data memory, a write buffer, a read buffer, a map buffer, and so forth.

The CPU (or processor) 120 may control general operations of the memory system 10, and a write operation or a read operation for the memory device 200, in response to a write request or a read request from the host device. The CPU 120 may drive firmware, which is referred to as a flash translation layer (FTL) to control the general operations of the memory system 10. For example, the FTL may perform operations such as logical to physical (L2P) mapping, wear leveling, garbage collection, and bad block handling.

The ECC unit 130 may detect and correct errors in the data read from the memory device 200 during the read operation. The ECC unit 130 may not correct error bits when the number of the error bits is greater than or equal to a threshold number of correctable error bits, and may output an error correction fail signal indicating failure in correcting the error bits. The ECC unit 130 may include an ECC encoder 132 and an ECC decoder 134.

The ECC encoder 132 may perform error correction encoding on data to be programmed into the memory device 200 to output data to which parity bits are added. The parity bits may be stored in the memory device 200.

The ECC decoder 134 may perform error correction decoding on data read from the memory device 200. The ECC decoder 134 may determine whether the error correction decoding is successful, and may output an instruction signal based on the determination result. The ECC decoder 134 may correct error bits of data using parity bits generated by the ECC encoding.

In some embodiments, the ECC unit 130 may perform an error correction operation based on coded modulation such as a low density parity check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), a Block coded modulation (BCM), and so on The ECC unit 130 may include all circuits, systems or devices for the error correction operation.

The host interface 140 may communicate with the host device through one or more of various interface protocols such as a universal serial bus (USB), a multi-media card (MMC), a peripheral component interconnect express (PCI-E), a small computer system interface (SCSI), a serial-attached SCSI (SAS), a serial advanced technology attachment (SATA), a parallel advanced technology attachment (PATA), an enhanced small disk interface (ESDI), and an integrated drive electronics (IDE).

The memory interface 150 may provide an interface between the controller 100 and the memory device 200 to allow the controller 100 to control the memory device 200 in response to a request from the host device. The memory interface 150 may generate control signals for the memory device 200 and process data under the control of the CPU 120. When the memory device 200 is a flash memory such as a NAND flash memory, the memory interface 150 may generate control signals for the memory and process data under the control of the CPU 120.

The memory device 200 may include a memory cell array 210, a control circuit 220, a voltage generation circuit 230, a row decoder 240, a page buffer 250, a column decoder 260, and an input/output circuit 270. The memory cell array 210 may include a plurality of memory blocks 211 and may store data therein. The voltage generation circuit 230, the row decoder 240 the page buffer 250 the column decoder 260 and the input/output circuit 270 form a peripheral circuit for the memory cell array 210. The peripheral circuit may perform a program, read, or erase operation of the memory cell array 210. The control circuit 220 may control the peripheral circuit.

The voltage generation circuit 230 may generate operation voltages having various levels. For example, in an erase operation, the voltage generation circuit 230 may generate operation voltages having various levels such as an erase voltage and a pass voltage.

The row decoder 240 may be connected to the voltage generation circuit 230, and the plurality of memory blocks 211. The row decoder 240 may select at least one memory block among the plurality of memory blocks 211 in response to a row address RADD generated by the control circuit 220, and transmit operation voltages supplied from the voltage generation circuit 230 to the selected memory blocks among the plurality of memory blocks 211.

The page buffer 250 is connected to the memory cell array 210 through bit lines BL (not shown). The page buffer 250 may precharge the bit lines BL with a positive voltage, transmit/receive data to/from a selected memory block in program and read operations, or temporarily store transmitted data, in response to a page buffer control signal generated by the control circuit 220.

The column decoder 260 may transmit/receive data to/from the page buffer 250 or transmit/receive data to/from the input/output circuit 270.

The input/output circuit 270 may transmit to the control circuit 220, a command and an address, transmitted from an external device (e.g., the memory controller 100), transmit data from the external device to the column decoder 260, or output data from the column decoder 260 to the external device, through the input/output circuit 270.

The control circuit 220 may control the peripheral circuit in response to the command and the address.

Figure 3:
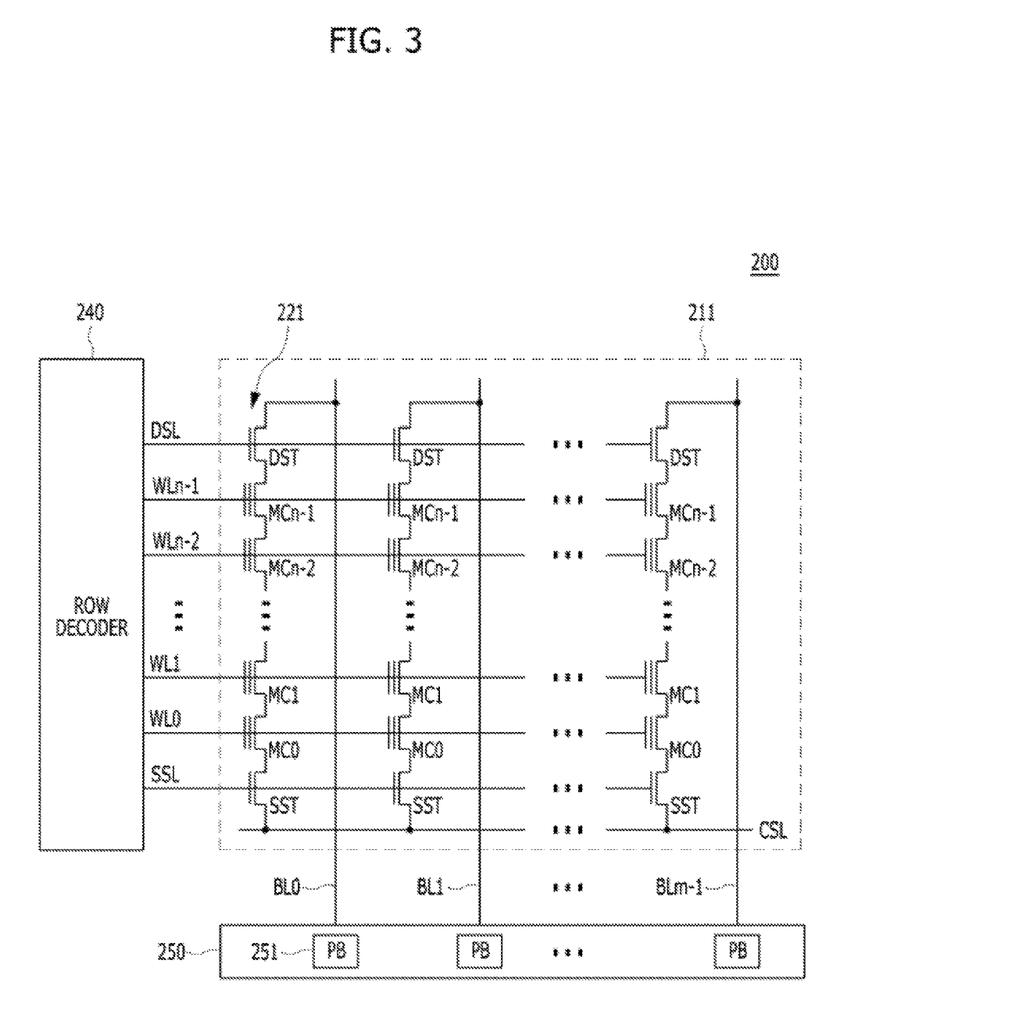
FIG. 3 is a circuit diagram illustrating a memory block of a semiconductor memory device in accordance with an embodiment of the present invention.

FIG. 3 is a circuit diagram illustrating a memory block of a semiconductor memory device in accordance with an embodiment of the present invention. For example, a memory block of FIG. 3 may be the memory blocks 211 of the memory cell array 200 shown in FIG. 2.

Referring to FIG. 3, the memory blocks 211 may include a plurality of cell strings 221 coupled to bit lines BL0 to BLm−1, respectively. The cell string of each column may include one or more drain selection transistors DST and one or more source selection transistors SST. A plurality of memory cells or memory cell transistors may be serially coupled between the selection transistors DST and SST. Each of the memory cells MC0 to MCn−1 may be formed of a multi-level cell (MLC) storing data information of multiple bits in each cell. The cell strings 221 may be electrically coupled to the corresponding bit lines BL0 to BLm−1, respectively.

In some embodiments, the memory blocks 211 may include a NAND-type flash memory cell. However, the memory blocks 211 are not limited to the NAND flash memory, but may include NOR-type flash memory, hybrid flash memory in which two or more types of memory cells are combined, and one-NAND flash memory in which a controller is embedded inside a memory chip.

Different from hard disks, the "erase-before-write" limitation of flash memory requires a special layer of system software called flash translation layer (FTL) to emulate a block device interface for backward compatibility. File systems and applications can use flash memory as if they were using a hard disk The FTL is a mapping table from logical block address (LBA) to physical address. Since the FTL table is in DRAM (Dynamic Random Access Memory), which is a volatile memory, when sudden power loss happens, the FTL table will be lost, which causes data loss. To prevent data loss, firmware must be able to rebuild the up-to-date table when power is turned back on. The typical (for capacity no more than 2 TB) size of an FTL table is $1/1000$ of the drive capacity. Thus, frequently writing the table to the NAND (or memory in general) would cause significant write performance degradation. With limited performance degradation, how to perform fast sudden power off recovery (SPOR) is an important but difficult task.

Figure 4:
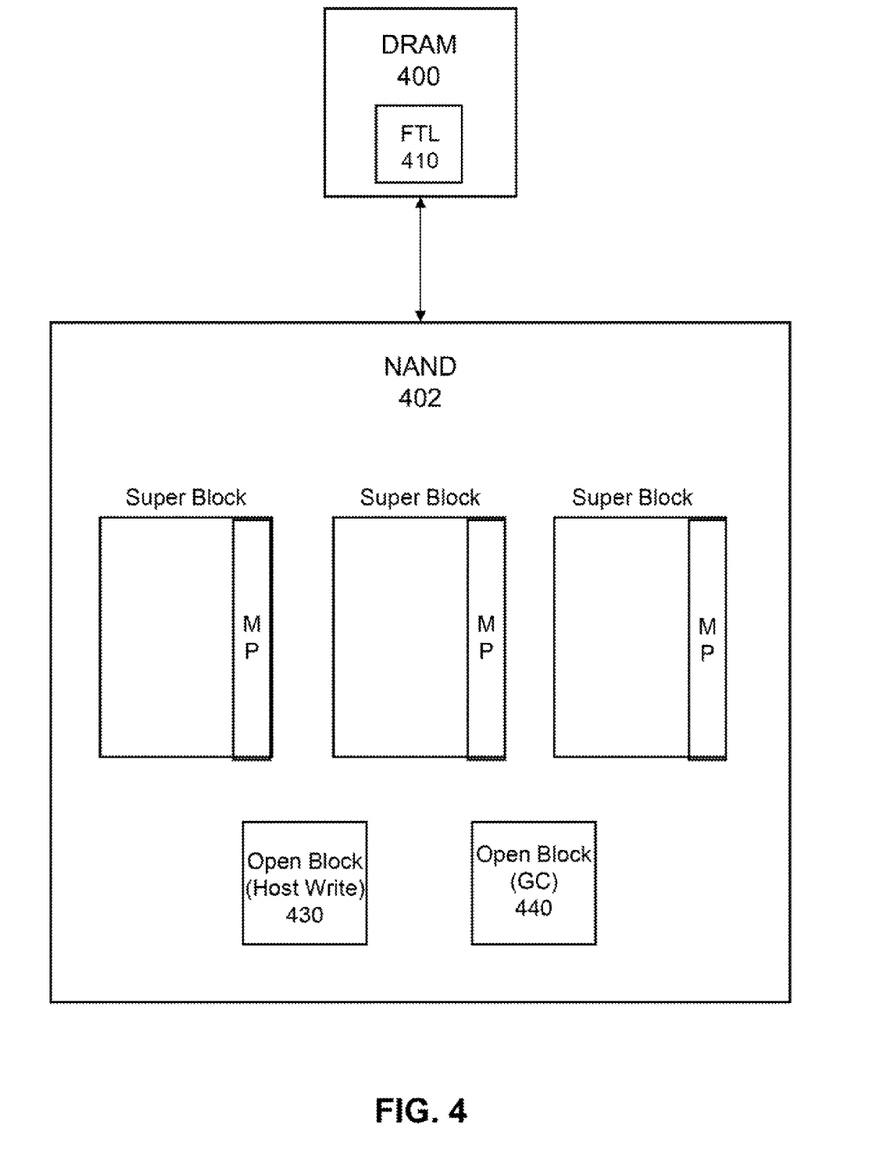
FIG. 4 is a block diagram illustrating memory blocks according to aspects of the invention.

Referring to FIG. 4, an example memory system is shown for illustrating a typical SPOR procedure. The memory system includes a DRAM 400, which includes the FTL 410. The DRAM 400 is typically separate from the memory/ NAND 402. The NAND 402 includes a plurality of super blocks. To have maximum parallelism, the physical blocks with the same block index in each die are grouped into a super block. The pages with the same page index in each physical block of the same super block are grouped as a super page. When a super block is full and ready to be closed, the LBAs of the pages in the super block are written at the end of it as the meta-page (e.g., MP in FIG. 4). When sudden power loss happens, the NAND 402 has two open blocks, an open block for host writes 430, and an open block for garbage collections (GC) 440, as well as many other closed blocks (e.g., closed super blocks).

During the SPOR, for the open blocks 430 and 440, all the user pages need to be read out and the LBAs need to be retrieved for each of them. For closed blocks, the meta-pages MP are read and the mapping information is updated (or replayed) to the table FTL in the order of time, meaning, oldest meta-page first. In this way, the valid mapping information will overwrite the invalid mapping information for a particular LBA. When the replay/update is done, the entire table is rebuilt and the host commands can start to be served.

The problem with this procedure is that the replay of meta-pages takes a substantial amount of time because it requires a huge number (which depends on the capacity of the drive) of random accesses to the DRAM 400. The entire rebuild takes about 80 seconds for 1 TB drive. The typical customer requirement for SPOR time is around 2 to 4 seconds regardless of capacity. Therefore, improved algorithms for SPOR rebuild are desired, better meaning both faster and scalable. Scalable refers to the rebuild time being independent from the drive capacity.

Figure 5:
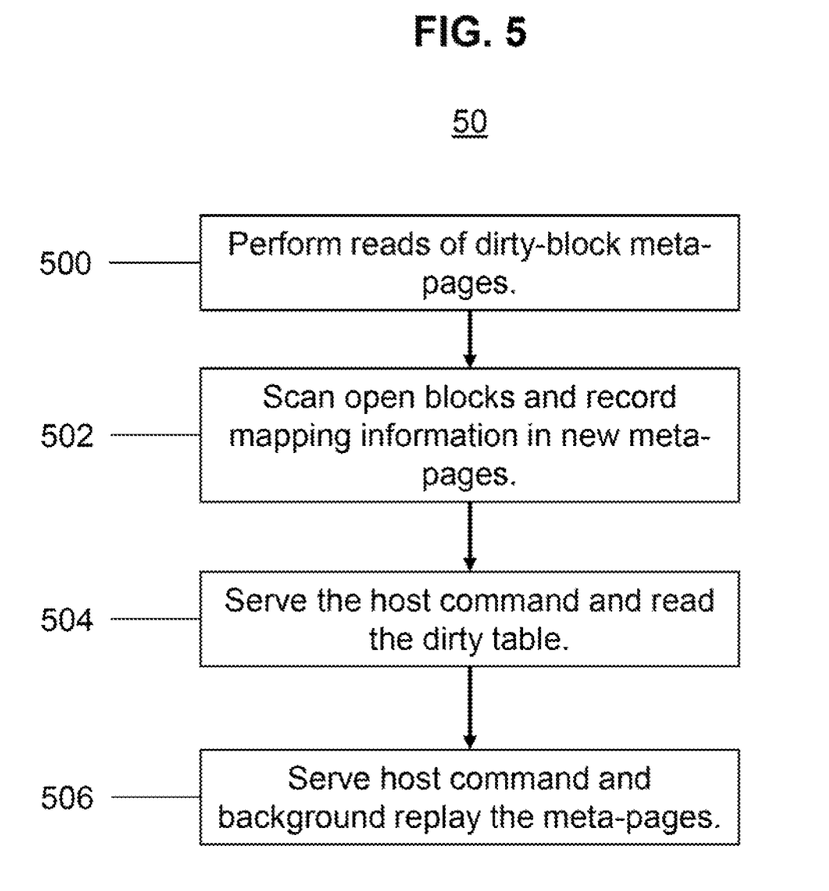
FIG. 5 is a flowchart of steps in a method for sudden power off recovery according to aspects of the invention.
Figure 6:
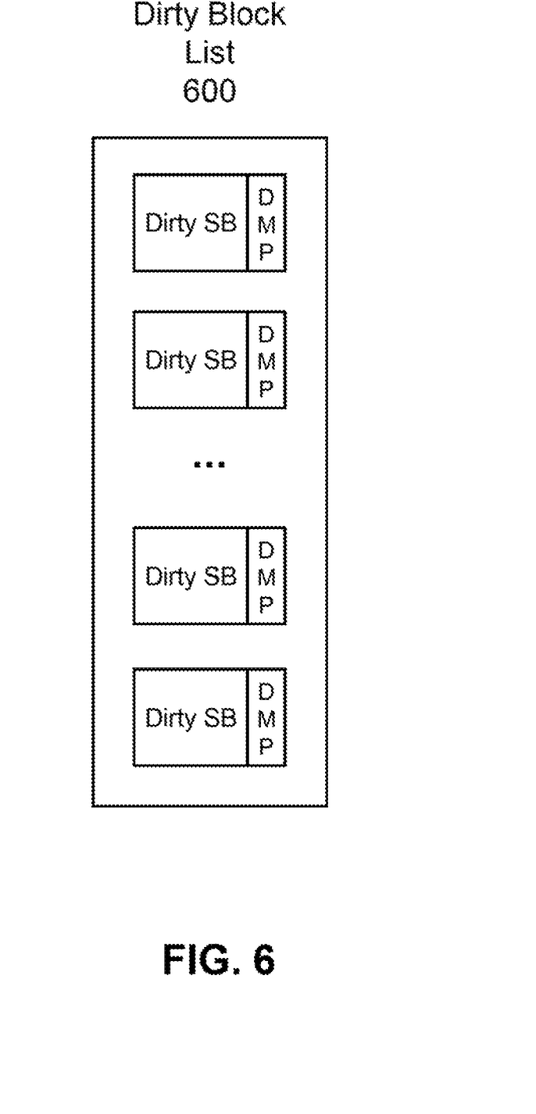
FIG. 6 is a block diagram illustrating a dirty block list in accordance with aspects of the invention.
Figure 7A:
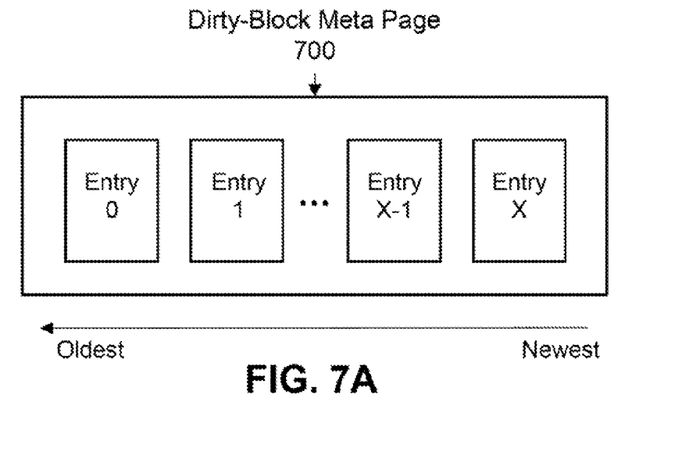
FIGS. 7A, 7B, and 7C are block diagrams illustrating meta-pages according to aspects of the invention.
Figure 7B:
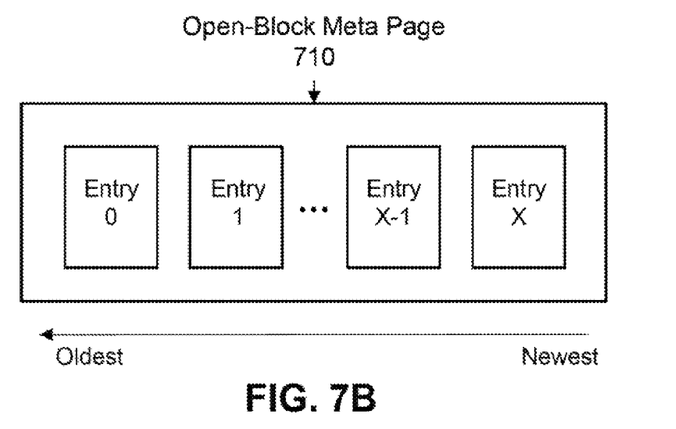
Figure 7C:
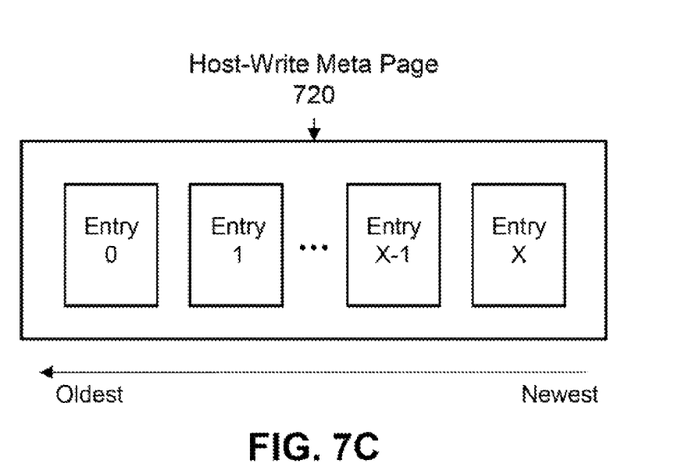

Referring to FIGS. 4, 5, 6, 7A, 7B, and 7C, an improved process for faster and scalable SPOR is disclosed herein. FIG. 5 is a flowchart 50 of steps in a method for conducting SPOR. FIG. 6 is a block diagram showing a dirty block list 600. FIGS. 7A 7B, and 7C are block diagrams depicting a dirty-block meta-page 700 with a plurality of entries, an open-block meta-page 710 with a plurality of entries, and a host-write meta-page 720 with a plurality of entries, respectively.

The scalable SPOR processes, and methods, systems, and devices for effectuating the invention disclosed herein, may include various steps. These steps may be performed by a controller, or other hardware suitable for performing these steps as will be understood to those of skill in the art from the description herein.

At step 500, dirty-block meta-page reads are performed. Thus, meta-pages from the blocks which are on the dirty block list 600 are read before other meta-pages. For example, a dirty block list 600 may include a number of dirty super blocks SB, each having its own dirty meta-page DMP. The meta-page entries are already stored during the meta-page write. Thus, these meta-pages are called dirty-block meta-pages, such as dirty-block meta-page 700.

At step 502, open blocks are scanned and mapping information is recorded in new meta-pages. Open blocks may be scanned and mapping information may be recorded in new meta-pages in a sorted procedure (e.g., sorted by LBA). If multiple entries with the same LBA exist, the newer entry is written to the right. These meta-pages are open-block meta-pages, such as open-block meta-page 710. As shown, the newer entries are written toward the right of the meta-page 710 (e.g., entry X), and the older entries are written toward the left of the meta-page 710 (e.g., entry 0).

At step 504, the host commands are served and the dirty table is read. The dirty table refers to the FTL 410 being "dirty" following a sudden power loss. The processes of host commands and dirty table read may be mixed according to a certain priority. When a host command is processed, the LBA in the meta-pages is looked up (both dirty-block meta-pages 700 and open-block meta-pages 710). The look up is done from the newest meta-page to the oldest meta-page. Inside every meta-page, the look-up will be performed from right to left (e.g., new to old), so that if there are multiple entries with the same LBA, the newest one will be found first. If the LBA is found host command will be served and the physical address in the meta-page will be modified (for write commands). If the LBA is not found, the page, which contains the L2P mapping information, from the dirty table in system a area will be read. This operation will require an additional 50 micro-second of latency, but this is relatively minor.

In this case, if the command is a write command, the new mapping information needs to be saved in a new meta-page, which is the host-write meta-pages 720. Notably, all the dirty information created by host writes during the dirty table read should be kept in the meta-pages, and not in the dirty table. During serving host commands, the dirty table is continued to be read until the whole table is in the DRAM 400.

During step 504, the number of meta-pages due to the newly created host-write meta-pages may be increased, but the increase will be very small and bounded given the write bandwidth of 520 MB/s-540 MB/s in Pearl. Given the fact that the table size is fixed, some space in the DRAM 400 may be preserved for the newly created host-write meta-pages 720 (e.g., running out of memory is not an issue). For example, for 1 TB drive, the table read will be finished in 2 seconds. Using half of time slots to serve host commands, the table read can be performed in 4 seconds. During the 4 seconds, two host-write meta-pages 720 may be created because the write bandwidth is also cut by half. As a result, the whole table may be flushed (in segments) every 81 block host writes, instead of 83. Thus, 81 dirty-block meta-pages 700 will be used and there will be space left for two host-write meta-pages 720.

At step 506, host commands are served and the meta-pages are replayed in the background. The meta-pages (dirty-block meta-pages 700, open block meta-pages 710, and host write meta-pages 720) may be (at least initially) replayed in the order of old to new. It is noted that host-write meta-pages 720 should be newer than open-block meta-pages 710, and open-block meta-pages should be newer than dirty-block meta-pages 700. Inside every meta-page, the entries are replayed from left to right (e.g., old to new), so that a valid physical address can overwrite invalid ones if the same LBA occurs multiple times in a meta-page.

During background replay, host commands may also be served. If an LBA can be found in the meta-pages, the entry found in the meta-pages may be used and updated (e.g., for write commands). If the LBA cannot be found in meta-pages, to the FTL 410 table will be read to use/update the entry in the table. In step 506, the number of meta-pages can only be decreased, thus there is no issue regarding running out of memory.

Therefore, the table may start to be read after host commands start to be served. Furthermore, with the invention disclosed herein, SPOR can be performed in less than one second regardless of drive capacity.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of sudden power off recovery (SPOR), comprising:
    reading dirty-block meta-pages from memory blocks on a dirty block list;
    scanning open-blocks and recording mapping information thereof in open-block meta-pages;
    serving host commands by looking up logical block addresses (LBAs) in the dirty-block meta-pages and the open-block meta-pages; and
    when an LBA is not found in the dirty-block meta-pages or the open-block meta-pages, reading new mapping information from a dirty table and saving the new mapping information in host-write meta-pages, and storing dirty information created by host writes in the host-write meta-pages but not in the dirty table.

2. The method of claim 1, further comprising:
    replaying, in the background, the dirty-table meta-pages, the open-block meta-pages, and the host-write meta-pages in order of old to new such that a valid physical address overwrites an invalid physical address if an LBA occurs multiple times in one meta-page.

3. The method of claim 2, further comprising serving host commands while performing the replaying step.

4. The method of claim 1, wherein the looking up is performed from a newest meta-page to an oldest meta-page.

5. A system for performing sudden power off recovery (SPOR), comprising:
    a dynamic random access memory (DRAM) including a flash transition layer (FTL) table;
    a memory storage suitable for storing dirty-block meta-pages, open-block meta-pages, and host-write meta-pages; and
    a controller suitable for:
        reading the dirty-block meta-pages from memory blocks on a dirty block list;
        scanning open-blocks and recording mapping information thereof in the open-block meta-pages;
        serving host commands by looking up logical block addresses (LBAs) in the dirty-block meta-pages and the open-block meta-pages; and
        when an LBA is not found in the dirty-block meta-pages or the open-block meta-pages, reading new mapping information from the FTL table and saving the new mapping information in the host-write meta-pages, and storing dirty information created by host writes in the host-write meta-pages but not in the dirty table.

6. The system of claim 5, wherein the controller is further suitable for preserving space in the DRAM for storing the host-write meta-pages.

7. The system of claim 5, wherein the controller is further suitable for replaying, in the background, the dirty-table meta-pages, the open-block meta-pages, and the host-write meta-pages in order of old to new such that a valid physical address overwrites an invalid physical address if an LBA occurs multiple times in one meta-page.

8. The system of claim 7, wherein the controller is further suitable for serving host commands while performing the replaying.

9. The system of claim 5, wherein the controller is further suitable to perform the looking up from a newest meta-page to an oldest meta-page.

10. A memory device, comprising:
    a controller configured to:
        read dirty-block meta-pages from memory blocks on a dirty block list;
        scanning open-blocks and record mapping information thereof in open-block meta-pages;
        serve host commands by looking up logical block addresses (LBAs) in the dirty-block meta-pages and the open-block meta-pages; and
        when an LBA is not found in the dirty-block meta-pages or the open-block meta-pages, read new mapping information from a dirty table and save the new mapping information in host-write meta-pages, and store dirty information created by host writes in the host-write meta-pages but not in the dirty table.

11. The memory device of claim 10, wherein the controller is further configured to replay, in the background, the dirty-table meta-pages, the open-block meta-pages, and the host-write meta-pages in order of old to new such that a valid physical address overwrites an invalid physical address if an LBA occurs multiple times in one meta-page.

12. The memory device of claim 10, wherein the controller is further configured to serve host commands during replay.

13. The memory device of claim 10, wherein the looking up is performed from a newest meta-page to an oldest meta-page.

* * * * *